United States Patent Office 2,790,249
Patented Apr. 30, 1957

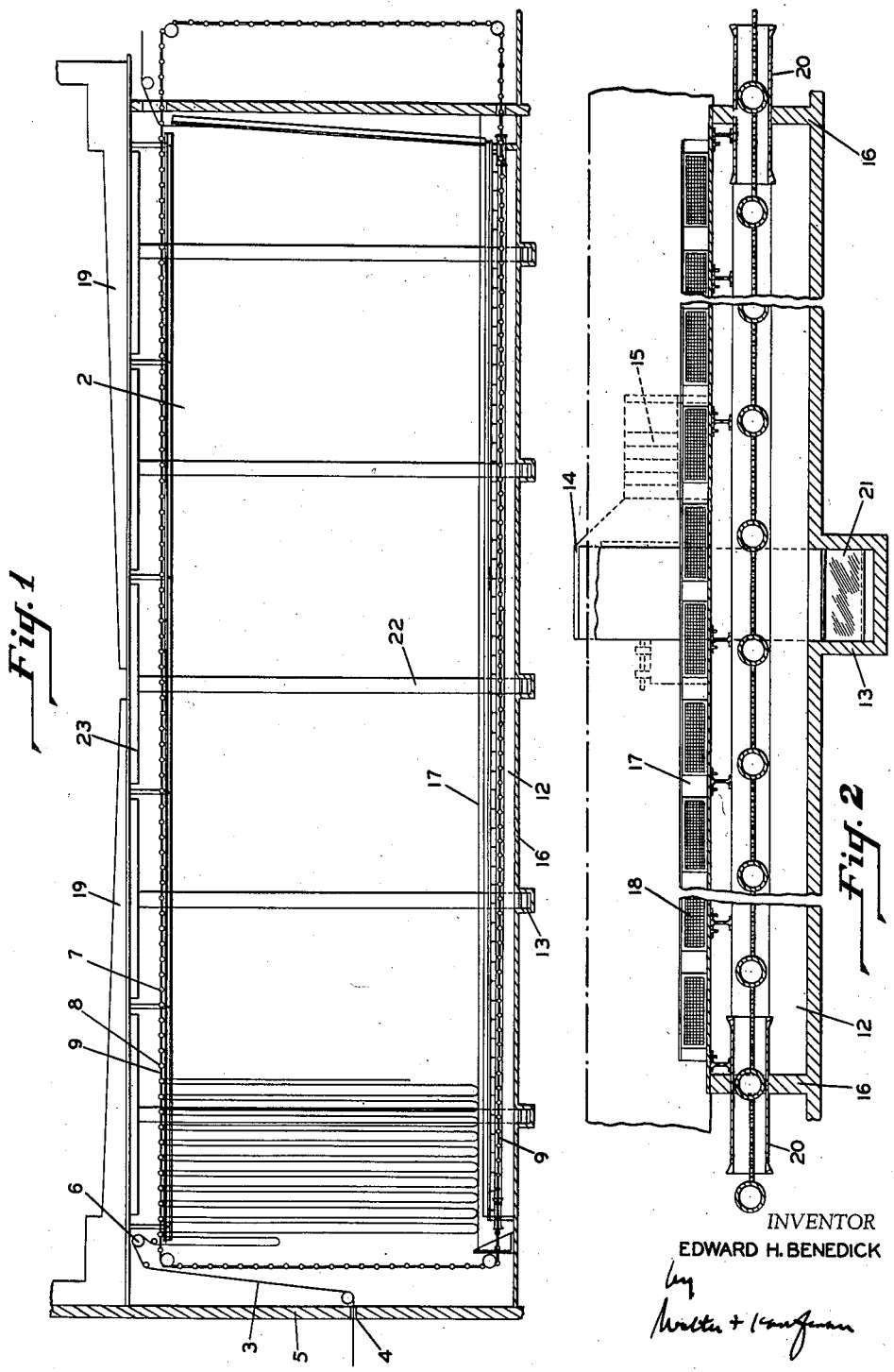

2,790,249

HEATING DEVICE

Edward H. Benedick, West Lampeter Township, Lancaster County, Pa., assignor to Armstrong Cork Company, Lancaster, Pa., a corporation of Pennsylvania Application November 23, 1953, Serial No. 393,632

3 Claims. (Cl. 34—157)

This invention relates to a system for controlling the temperature in relatively large ovens and particularly ovens of the type used to mature festoons of sheet material such as continuous webs of floor and wall covering.

In the maturing of continuous webs of sheet material such as linoleum and felt base for floor and wall covering, it has been common practice to place the material in large curing ovens heated by means of hot air to elevate the temperature of the material to a degree sufficiently high to insure curing.

In carrying out this process, two systems have been used. In one system, the continuous web of sheet material is hung in festoons in the curing oven and permitted to remain there during the curing cycle, at the expiration of which the material is removed from the curing oven and stored for subsequent usage. In the other system, the material is fed to and removed from the oven continuously and the festoons of sheet material move through the oven at a rate of speed sufficient to move them from the intake end of the oven to the discharge end during the required curing cycle.

In both systems, the means of conducting heat into the curing oven to maintain the temperature of the sheet material being processed at a point sufficiently high to insure adequate maturing is the same. Hot air is forced into the top of the oven through ducts directed down onto the top of the festoons, or the ducts are extended down along the sides of the oven for a limited distance and then turned outwardly to direct the heated air directly onto the surface of the material hanging in festoons. In the case of the individual batch maturing system, the festoons which are hanging closest to the heat outlets are overmatured, while the other material in the same oven is undermatured during the same period of time.

In the case of the continuously operating curing cycle, the movement of the festoons through the oven creates air currents which stratify the air in the oven, creating cold zones and hot zones, resulting in uneven maturing of the material passing through the chamber. Also in the continuous system the conveyor used to carry the festoons through the oven must of necessity move from the oven to the outside atmosphere and come back into the oven. When the conveyor comes back into the oven, its temperature is substantially lower than the temperature of the oven and a great deal of heat is absorbed by the conveyor at the point where it enters the oven from the outside, thus creating a cold zone in this area.

In order to overcome the disadvantages of the system of heating above outlined, the system set forth in this specification has been developed. In this system, all of the heat is injected into a plenum chamber comprising the entire bottom portion of the oven. The heat is forced from the plenum chamber uniformly along the entire length of the oven so that the heat will rise uniformly throughout the height of the oven.

An object of this invention is to provide a heat distribution system in which a uniform distribution of hot air can be effected throughout the entire length, height, and width of a large industrial oven.

Another object of this invention is to provide a system to induce heating air or cooling air into an oven, depending on the requirements at any one particular time, and to introduce either hot or cool air at the point where it will be most effective to produce the desired result.

In order that the invention may be more readily understood, it will be described in connection with the attached drawings, in which:

Figure 1 is a side elevational view of an oven showing the installation of the heating system and the horizontal plenum chamber located along the bottom of the oven;

Figure 2 is an enlarged view of one compartment of the plenum chamber; and

Figure 3:
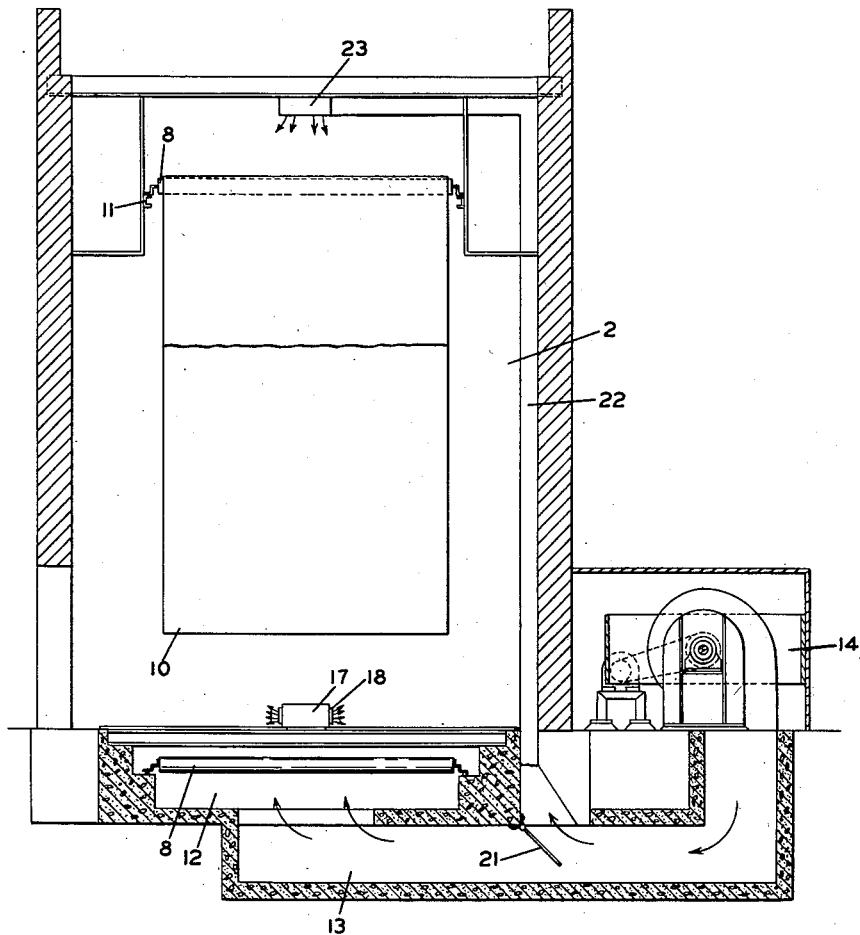
Figure 3 is a cross sectional elevational view of Figure 1.

Referring to Figure 1, there is shown a curing oven 2, which in the conventional industrial installation for processing continuous webs of sheet material such as floor and wall coverings is approximately 60 feet high, 200 feet long, and 12 feet wide. In the embodiment here illustrated, the process utilized is one in which the web of sheet material moves continuously through the oven during the curing cycle. The web of sheet material 3 to be matured is fed into the oven through an opening 4 in the back of the wall 5 close to the bottom of the oven. The material then moves in an upward direction, being pulled by a pull roll 6 located at the top of the oven. The endless conveyor 7 comprises a plurality of rollers 8 carried by chains 9 and engages the material at the top of the oven immediately beneath the pull roll 6. The material is held in engagement with one of the rollers by means of a conventional bightmaker such as that disclosed in United States Patent No. 2,620,183, issued December 2, 1952. The material is held in engagement with the roller 8 until the festoon 10 is of sufficient length, at which time the roller will have moved in a horizontal direction sufficiently far that the next roller 8 will engage the web of material 3 and the holding operation will be performed on that roller. The continuous movement of the conveyor on the track 11 along the top of the oven moves the individual festoons from one end of the oven to the other during the curing cycle.

The heat for maturing the sheet material is forced into a plenum chamber 12 through a duct 13 leading from a fan 14 located outside the oven. The heated air is made accessible to the fan 14 by suitable heaters shown generally at 15. The plenum chamber 12, which extends the entire length and width of the oven, is divided into a plurality of compartments, and in the specific embodiment shown five compartments have been found satisfactory. Each compartment is provided with a duct 13 leading from a separate fan 14. The compartments are separated from one another by means of bulkheads 16.

Along the entire length of the plenum chamber 12 is a continuous heating duct 17 running the entire length of the plenum chamber and oven. This duct 17 is closed at the top but is provided with louvers 18 in the sides to permit the escape of hot air from the sides of the duct. The air is forced into the individual compartments of the plenum chamber with sufficient force that it will rise into the duct 17 and be forced through the louvers with sufficient force to carry the hot air in a horizontal direction toward the sides of the oven. The hot air preferably leaves the duct with sufficient force to obtain an aspirating ratio of approximately 4 to 1. In other words, each cubic foot of hot air leaving the duct will become associated with approximately three cubic feet of oven air at a lower temperature and these three cubic feet will be increased in temperature by the hot air supplied by the duct, so that for each cubic foot of hot air supplied by the duct approximately four cubic feet will be utilized in maturing the material. With this mixing of the hot air just introduced into the oven with the air already therein, the temperature of the mixture of air which contacts the surface of the material is lower than the hot air entering the oven, and scorching or overmaturing is prevented. In no instance does the hot air entering the oven blow directly on the material. As a specific example, if air at 250° F. enters the oven it will mix with the air in the oven, and the temperature of the hot air actually coming in contact with the material will be approximately 220° F. With this system all of the hot air is fed uniformly into the bottom of the curing chamber and rises uniformly from the bottom to the top, contacting all of the material hung therein or passing therethrough. At the top of the oven are two exhaust ducts 19 which pick up the air and exhaust it to the outside. There is no recirculation of air in the oven.

The size of the individual compartments of the plenum chamber 12 may be varied, depending on the requirements in a particular area of the oven; for example, the compartment in which the conveyor enters the plenum chamber should preferably be small and a large amount of heat supplied thereto to adequately heat the conveyor so that the conveyor will not create a cold zone in the oven. The conveyor passes through tunnels 20 in the bulkheads 16. The tunnels 20 are of a length greater than the spacing between the individual rollers 8 of the conveyor so that at least one roller will be in the tunnel at all times to prevent the transfer of hot air from one compartment of the plenum chamber to the other compartment. Both the volume and temperature of the air supplied to each compartment of the plenum chamber may be accurately controlled by means of conventional controls placed in the compartments or in the oven to insure that a uniform temperature is maintained throughout the entire curing oven.

In processing certain types of material, it has been found that the saturant which is being dried or matured causes an exothermic reaction in the sheet material, substantially increasing the temperature of the sheet material above that desired. In order to counteract the exothermic reaction, each duct 13 leading from the fan 14 to the individual compartments of the plenum chamber 12 is provided with a damper 21. In case the sheet material passing through any area of the oven above a specific compartment in the plenum chamber is found to be increasing in temperature, the damper 21 may be moved to its downward position, thereby closing off the duct between the fan 14 and the plenum chamber 12, diverting the air up the vertical duct 22 to the top of the oven. At the top of the oven a horizontal duct 23 extends along the length of the oven for a distance comparable to the distance covered by the compartment of the plenum chamber beneath it. When this is done, air at a cooler temperature is supplied by the same fan 14 through duct 13, vertical duct 22 to the duct 23. This cold air is directed down onto the sheet material and cools the material to a degree sufficient to prevent ignition from the exothermic reaction. When the temperature in one of the zones rises above the desired operating temperature, the cold air introduced at the top of the oven (by virtue of its density) will flow downwardly, reducing the web temperature and increasing the air temperature to the desired operating temperature of the oven. This obviates the disadvantage resulting from the cold air being introduced at the bottom of the oven, in which case it remains in the bottom and spreads out, reducing the operating temperature in adjacent zones and is ineffective in reducing the temperature of the web in the zone where the exothermic reaction is taking place. With this system, it is possible to force hot air into the bottom of the oven to mature the material or to force cold air into the top of the oven to counteract the exothermic reaction which takes place in the sheet material.

In installing the system covered by this invention in a new oven, the embodiment illustrated and described herein is highly satisfactory; however, in the case of converting existing ovens to use this system, it is not always convenient to place the blower 14 in a building immediately adjacent the oven. This can be accomplished by placing the blower on top of the oven and blowing the hot air down through the ducts along the side of the oven into the individual compartments of the plenum chamber located in the same area shown in the drawings. In this embodiment the damper 21 should be located at the top of the duct 22 so as to by-pass the air into the duct 23 immediately upon its entrance into the oven at the top.

In the system covered by this application, it is possible to accurately and uniformly control the temperature throughout large industrial curing ovens during either batch operation or continuous operation, and it is also possible to counteract an increase in temperature caused by exothermic reaction by utilizing the same forced air system to blow cold air into the chamber as is ordinarily used to blow hot air into the chamber.

I claim:

1. In an oven, an endless conveyor for conveying festoons of sheet material horizontally through said oven, a portion of the path of travel of said conveyor being outside the oven, a plenum chamber positioned along the bottom of said oven in the path of travel of said endless conveyor, the arrangement being such that the conveyor moves directly from the outside into the plenum chamber and from the plenum chamber to the point of engagement with the sheet material its path of travel is within the oven, means for supplying heated air under pressure to said plenum chamber, a duct running along the top of said plenum chamber throughout the entire length of said oven, said duct being in communication with said plenum chamber and being provided with openings to permit the hot air to escape into the oven, and an exhaust system located on the top of the oven for carrying away the exhaust air.

2. In an oven, an endless conveyor for conveying festoons of sheet material horizontally throughout said oven, a portion of the path of travel of said conveyor being outside the oven, a plenum chamber positioned at the bottom of said oven in the path of travel of said endless conveyor, the arrangement being such that the conveyor moves directly from the outside into the plenum chamber and from the plenum chamber to the point of engagement with the sheet material its path of travel is within the oven, said plenum chamber being divided into a plurality of compartments, means for supplying heated air under pressure to each individual compartment, a continuous duct running along the top of said plenum chamber throughout the entire length of the oven, said duct being in communication with the individual compartments of the plenum chamber, and means for permitting the hot air to escape from said duct into the oven.

3. In an oven, an endless conveyor for conveying festoons of sheet material horizontally through said oven, a portion of the path of travel of said conveyor being outside the oven, a plenum chamber positioned at the bottom of said oven in the path of travel of said endless conveyor, the arrangement being such that the conveyor moves directly from the outside into the plenum chamber and from the plenum chamber to the point of engagement with the sheet material its path of travel is within the oven, means for supplying heated air under pressure to said plenum chamber, a duct running along the top of said plenum chamber throughout the entire length of said oven, said duct being in communication with said plenum chamber, a duct positioned at the top of said oven, means connected to said hot air supplying means for conducting air to the duct at the top of said oven to be directed downwardly therefrom, and means for diverting the air from the duct leading into the plenum chamber to the duct leading to the top of said oven.

References Cited in the file of this patent

UNITED STATES PATENTS

| | | |
|---|---|---|
| 1,176,982 | Pettibone et al. | Mar. 28, 1916 |
| 1,557,422 | Colbert et al. | Oct. 13, 1925 |
| 1,716,304 | Currier | June 4, 1929 |
| 1,900,846 | Russell et al. | Mar. 7, 1933 |
| 2,597,490 | Hurxthal | May 20, 1952 |

FOREIGN PATENTS

| | | |
|---|---|---|
| 273,785 | Great Britain | July 14, 1927 |